J. C. GARNER.
GIN SAW.
APPLICATION FILED NOV. 12, 1909.
1,017,637.
Patented Feb. 13, 1912.
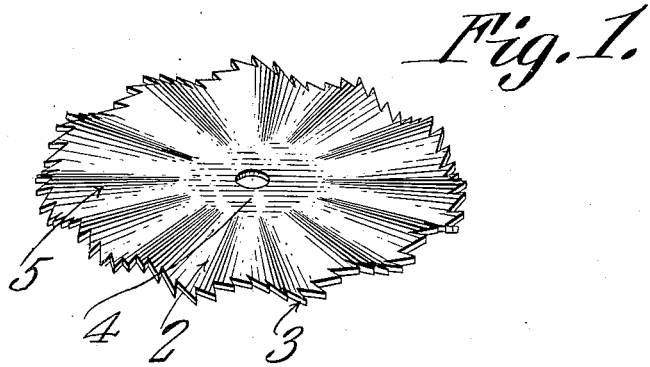
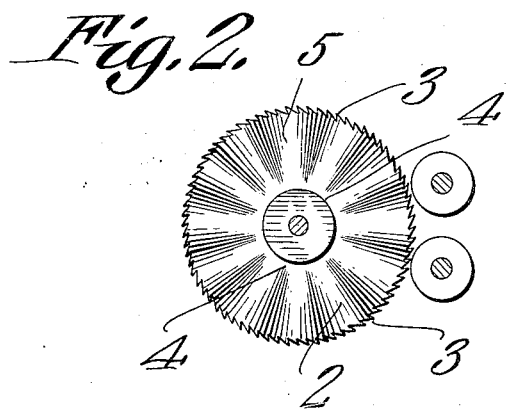
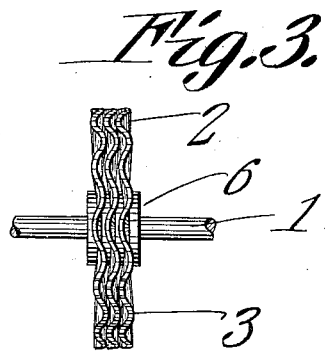
Inventor
James C. Garner.
Witnesses
By C. A. Snow & Co.
Attorneys

UNITED STATES PATENT OFFICE.

JAMES C. GARNER, OF DALLAS, TEXAS, ASSIGNOR OF ONE-HALF TO CHARLES S. REYNOLDS, OF HOUSTON, TEXAS.

GIN-SAW.

1,017,637. Specification of Letters Patent. Patented Feb. 13, 1912.

Original application filed May 11, 1909, Serial No. 495,271. Divided and this application filed November 12, 1909. Serial No. 527,655.

*To all whom it may concern:*

Be it known that I, JAMES C. GARNER, a citizen of the United States, residing at Dallas, in the county of Dallas and State of Texas, have invented a new and useful Gin-Saw, of which the following is a specification.

This invention relates to saw toothed drums or cylinders such as are used in re-gins, *i. e.*, gins adapted to denude cotton seed and hulls of lint, and in machines for renovating and cleaning cotton or similar fiber.

This application is a division of my earlier application for patent for cotton cleaners, filed May 11, 1909, Serial No. 495,271, in which latter application is shown a machine of the character referred to.

The object of the present invention is to provide a saw drum or a cylinder which will be capable of efficient operation for the purpose intended and which can be easily and cheaply produced and conveniently maintained in working order.

In machines of the kind referred to, the cotton or other fiber is usually fed in the form of a bat against the rapidly rotating saw drum, and it is desirable that the toothed surface of the drum should operate upon every point in the end of the advancing bat so as to insure a thorough working of the material. Various forms of construction have been proposed to accomplish this object. In one of these constructions a toothed band is wound around a drum or cylinder spirally or in serpentine fashion, thus forming a toothed cylindrical surface adapted when rotated to cover all points in the advancing bat of fiber. In another form of construction which has been proposed, toothed rings are set obliquely upon a cylindrical support, the rings being so spaced in relation to each other that the toothed surface when the drum is turned covers all points in the advancing bat of fiber. All of these earlier constructions, however, have proven defective or unsatisfactory in so far as I am aware. In the case of the spirally wound toothed band, it is very difficult to bend the toothed band edgewise if it is made deep enough radially to afford ample strength. Again, when once such a toothed cylinder has been produced it is difficult to keep it in working order, because the teeth, after a certain length of service, become dulled and the process of sharpening them is very tedious and difficult. In the case of the obliquely set toothed rings which have been proposed also, it is found difficult to sharpen the teeth when they have become dulled and in addition the oblique setting of the rings throws the surface of the drum somewhat out of round. That is to say, the toothed surface formed by such obliquely set rings has a slightly elliptical transverse section so that the cylinder acts somewhat in the nature of a beater upon the end of the advancing bat of fiber, so that the latter is not steadily and continuously attacked by the toothed surface. In my present invention I overcome these difficulties incident to prior constructions by providing a drum made up of a series or gang of disk saws which are mounted upon a rotating shaft and which have their peripheral parts radially crimped or corrugated, the disks being so spaced from each other in relation to the axial depth of the corrugations that the cylindrical toothed surfaces formed by each disk, when the drum is rotated, joins that of the adjacent disks so as to form a continuous toothed surface to attack the end of the advancing bat of fiber.

In the drawings, Figure 1 is a perspective view of one of the saws. Fig. 2 is a vertical section through the saw drum and the adjacent feeding rolls. Fig. 3 is a side elevation of a portion of the drum.

Referring in detail to the construction shown, 1 designates a shaft which may be rotatably mounted in suitable bearings and be driven by power in any desired manner. On this shaft are mounted a series or gang of disk saws 2, said saws being prevented from turning on the shaft in any desired manner, as for example, by a suitable key. Each of the saw disks is formed with teeth 3 of suitable size and shape and each disk has preferably a plane central part 4, while its peripheral part is bent or crimped to form radial corrugations 5. When the saws are assembled on the supporting shaft 1 they are spaced from each other preferably by spacing collars 6, and when all are assembled they can be clamped rigidly together. The thickness of the spacing collars 6 is such that the bounding planes of the adjacent disks approximately coincide. Thus, I produce a cylindrical toothed surface adapted, when rotated, to work upon all points of the end of a bat of fiber fed against said surface.

It will be seen that the manufacturing of a toothed drum in accordance with my invention is quite simple. The corrugated saw disks can be easily produced and the other parts, namely, the shaft and spacing collars, are quite simple, and the parts when produced can very readily be assembled to form the drum. Furthermore, the parts can as readily be disassembled when the saw teeth have become dulled from use, and this greatly facilitates the sharpening of the saws.

I am aware that it was proposed in the patent to Poore, 428,411 to make circular wood saws with a crimped or, as the patentee terms it, "serpentine" edge, and I make no claim to a saw so constructed. On the contrary my invention resides in the mounting of a series of such saws on a shaft with suitable means for spacing the saws from each other, the construction and arrangement being such as to secure the result in the working of cotton or similar fiber hereinbefore set forth, and to permit of the ready disassembling of the saws when it is desirable to sharpen them.

What I claim is:

1. A toothed drum for fiber cleaners and the like comprising in combination a shaft, and a series of saw disks thereon, said disks having their peripheral parts crimped or corrugated and being so spaced from each other that they form a substantially continuous cylindrical surface of rotation.

2. A toothed drum for fiber cleaners and the like comprising in combination a shaft, a series of saw disks mounted on the shaft, said disks having their peripheral parts corrugated or offset axially, and a series of spacing collars between said saw disks, the thickness of said spacing collars being such in relation to the axial depth of the corrugations of the disks that the drum when rotated has a substantially continuous cylindrical surface of rotation.

In testimony that I claim the foregoing as my own, I have hereto affixed my signature in the presence of two witnesses.

JAMES C. GARNER.

Witnesses:
B. H. GRAHAM,
T. E. HANCOCK.

---

Copies of this patent may be obtained for five cents each, by addressing the "Commissioner of Patents, Washington, D. C."